May 10, 1955   N. ORLANDI   2,708,120
AUTO BODY TILT CONTROL
Filed Aug. 9, 1954

INVENTOR.
Nello Orlandi
BY
Att'y

United States Patent Office 2,708,120
Patented May 10, 1955

2,708,120

AUTO BODY TILT CONTROL

Nello Orlandi, San Francisco, Calif.

Application August 9, 1954, Serial No. 448,479

2 Claims. (Cl. 280—112)

This invention relates to improvements in automobile construction and has particular reference to means for preventing the tipping or tilting of an automobile body as the same goes around a corner.

A further object is to produce a device of this character which may be attached to the ordinary automobile without materially altering its construction.

A further object is to produce a device of this character which is automatic in its operation, one which is economical to manufacture, and one which is easy to install.

A further object is to provide means for compensating for the variance in spring action, irrespective of the movement of the wheels.

A further object is to produce a device of this character which is equally applicable to front or rear wheels of the vehicle.

Other objects and advantages will be apparent during the course of the following description.

Figure 1:
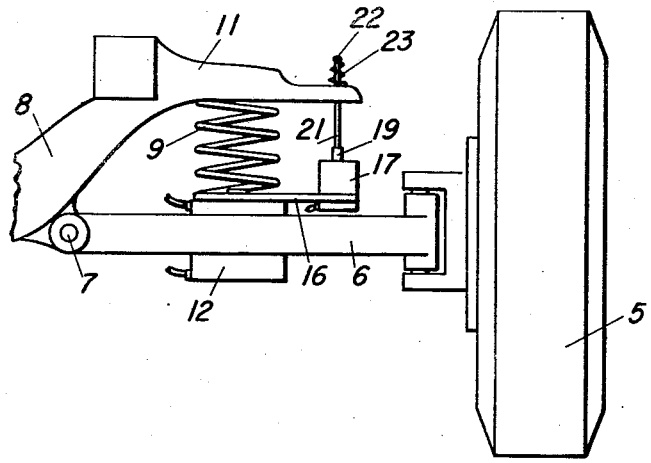
Figure 2:
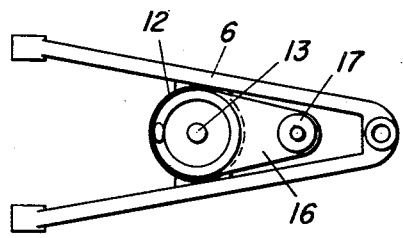
Figure 3:
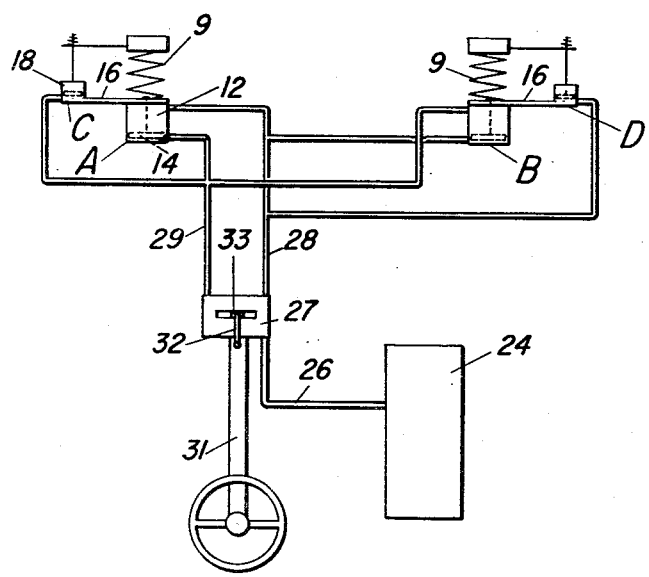

In the accompanying drawings forming a part of this specification and in which like numbers are employed to designate like parts throughout the same, Fig. 1 is a fragmentary front elevation of the front axle of an automobile having my invention applied thereto;

Fig. 2 is a top plan view of the knee action frame having my invention mounted thereon and partly in cross section, and Fig. 3 is a diagrammatic view showing the operating of my tilt control.

The ordinary motor vehicle in moving over a highway is supported by a plurality of springs at both the front and the back of the vehicle, the back springs being connected between the body frame and the rear axle, and springs positioned between the body frame and the front axle.

The result of this construction is that when the vehicle is moving along a straight section of highway, all of the springs function to maintain the body of the vehicle in a level position with respect to the surface of the road.

When the driver of the vehicle starts to make a turn either to the right or the left, the body of the vehicle will tend to tip in a direction away from the direction in which the vehicle is turning. This is caused by centrifugal action and it is to overcome this centrifugal action and to cause the body of the vehicle to tip against the centrifugal action so that the body will to some degree tip inwardly toward the center point of the arc of the turn being executed, that I have applied my invention.

In the accompanying drawings, wherein for the purpose of illustration is shown a preferred embodiment of my invention, the numeral 5 designates one of the front wheels which is pivoted to the customary A frame 6, which is in turn pivoted as at 7 to the chassis or body frame 8.

Ordinarily a spring 9 extends between the bracket 11 and a pad mounted on the A frame 6. In the present instance, however, applicant has positioned between the arms of the A frame a cylinder 12 which has a piston 14 (see Fig. 3) mounted therein. This piston has a piston rod 13, which is in turn attached to a plate 16 which underlies the bottom of the spring 9. This plate extends outwardly so as to support an auxiliary cylinder 17 which has a piston 18 therein, the piston rod 19 of which is connected by a cable 21 that extends upwardly through the bracket 11 and is attached as at 22 to the upper end of a spring 23, the lower end of which spring rests upon the top of the bracket.

By referring to Fig. 3, it will be noted that I have provided a vacuum tank 24 which is connected by a pipe 26 to a valve designated as a whole by the numeral 27.

A pipe 28 extends from the valve 27 to the top of the cylinder 12 on one side of the vehicle, which cylinder is designated at A in this figure, and to the bottom of a similar cylinder B positioned on the opposite side of the vehicle. A pipe 29 connects the valve 27 to the bottom of the cylinder A and to the top of the cylinder B. The auxiliary cylinder 17, designated in this figure by the letter C, is also connected at its bottom to the pipe 29, while the auxiliary cylinder D on the opposite side of the vehicle has its bottom portion connected to the pipe 28.

It is of course understood that the vacuum in the tank 24 may be maintained in any desired manner, as by connecting to the manifold of the engine.

At 31 I have shown a steering column which has a lever 32 which actuates a slider 33 to move the valve core so as to connect either of the pipes 28 or 29 to the pipe 26 as the case may be.

The result of this construction is that as long as the driver of the vehicle is moving along in a straight line, no vacuum will be admitted from the pipe 26 to either the pipe 28 or the pipe 29.

However, assuming that the driver is going to make a right-hand turn, the act of turning the steering wheel will cause the lever 32 to move the slider 33 toward the right of the drawing, which will connect the pipe 28 to the pipe 26 and vacuum tank 24. The vacuum in the pipe 28 will then be transmitted to the bottom of the cylinders B and D, thus holding the piston B and its attached plate 16 in its lowermost position. At the same time, vacuum in the cylinder D will cause its piston to move downwardly and exert a pull on the cable 21 and through the spring 23 exert a downward pressure on the right-hand side of the vehicle. Vacuum from the pipe 28 will also cause the piston in the cylinder A to move upwardly, moving its plate 16 upwardly and giving an up-thrust on the spring 9 of the left-hand side of the vehicle, thus tending to raise the left-hand side of the vehicle and to pull down on the right-hand side of the vehicle.

As the plate 16 moves upwardly with its cylinder, there will be no tendency of the same to counteract the increased upward thrust on the spring 9. The spring 23 is merely for the purpose of taking care of the expansion and contraction of the spring 9 under normal road conditions.

It is obvious that if the steering wheel were turned so the vehicle would move toward the left, then the action would be just the reverse of that described above. That is, there would be an up-thrust on the right-hand side of the vehicle and a drawing down on the left-hand side of the vehicle, which up-thrust and drawing down would be transmitted to the frame and vehicle body, tending to hold them in normal, level condition.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A vehicle body tilt control comprising the combination with the frame and pivoted wheel-supporting member and a spring positioned therebetween, of a cylinder positioned on said pivoted member, a movable piston mounted in said cylinder and having an upwardly extending piston rod, a plate carried by said rod and engaging one end of said spring, controlled fluid means for moving said piston, an auxiliary cylinder mounted on said plate, said auxiliary cylinder having a piston and rod, said rod having a flexible connection with said frame said controlled fluid means also affecting said piston in said auxiliary cylinder to exert a downward pull on said frame.

2. A vehicle body tilt control comprising the combination with the frame of a vehicle having a pivoted wheel-supporting member and a spring secured to said frame and having its lower end in alignment with said pivoted member, of a cylinder mounted on said movable member, a piston movable in said cylinder and having an upwardly extending piston rod, a plate secured to said piston rod and overlying said cylinder and engaging the bottom of said spring, means for controlling the movement of said piston upwardly or downwardly to vary the tension on said spring, an auxiliary cylinder mounted on said plate, a piston movable in said cylinder, a piston rod extending upwardly from said piston, a flexible connection between said rod and said body, valved fluid means for moving said piston downwardly to exert a pull on said body against the tension of said spring, said valve means also simultaneously maintaining said first mentioned piston in its lowermost position.

References Cited in the file of this patent

FOREIGN PATENTS 518,848     Great Britain  ---------- Mar. 8, 1940